United States Patent [19]

Hegemann et al.

[11] 4,152,123
[45] May 1, 1979

[54] GAS-CLEANING APPARATUS AND METHOD FOR HIGH-PRESSURE BLAST FURNACE

[75] Inventors: Karl-Rudolf Hegemann, Essen-Bergerhausen; Helmut Weissert, Bochum-Hiltrop; Theodor Niess, Mülheim, all of Fed. Rep. of Germany

[73] Assignee: Gottfried Bischoff Bau Kompl. Gasreinigungs- und Wasserruckkuhlanlagen GmbH & Co. Kommanditgesellschaft, Essen, Fed. Rep. of Germany

[21] Appl. No.: 882,421

[22] Filed: Feb. 28, 1978

[30] Foreign Application Priority Data

Dec. 16, 1977 [DE] Fed. Rep. of Germany ....... 2756106

[51] Int. Cl.$^2$ ............................................. B01D 47/00
[52] U.S. Cl. ......................................... 55/85; 55/89; 55/95; 55/226; 55/228; 261/DIG. 54; 261/DIG. 77; 261/110; 266/159
[58] Field of Search ...................... 55/226, 85, 89, 240, 55/95, 228; 261/DIG. 54, DIG. 11, DIG. 77, 71, 110; 266/145–147, 155–159; 210/525

[56] References Cited

U.S. PATENT DOCUMENTS

| | | | |
|---|---|---|---|
| 3,265,122 | 8/1966 | Ostrander | 261/DIG. 11 |
| 3,726,065 | 4/1973 | Hausberg et al. | 261/DIG. 54 |
| 3,773,472 | 11/1973 | Hausberg et al. | 261/DIG. 54 |
| 3,844,744 | 10/1974 | Hausberg et al. | 55/226 |
| 3,844,745 | 10/1974 | Hausberg et al. | 55/213 |
| 3,854,908 | 12/1974 | Hausberg et al. | 55/226 |
| 4,007,025 | 2/1977 | Hegemann | 55/226 |
| 4,013,455 | 3/1977 | Kleeberg et al. | 55/226 |
| 4,052,042 | 10/1977 | Hegemann et al. | 55/226 |

*Primary Examiner*—Bernard Nozick
*Attorney, Agent, or Firm*—Karl F. Ross

[57] ABSTRACT

The gases emerging from a high-pressure gas furnace are subject to coarse particle separation and then to washing and scrubbing with water before driving an expansion turbine which has a gas bypass so that the turbine can be cut off. The scrubbing water recycled to the scrubber when the turbine is cut off, is permitted to traverse a cooler of the washing-water recovery unit but, when the turbine is operative, the scrubbing water bypasses the cooler. The water introduced into the scrubber can thus have a temperature of about 25° C. when the turbine is bypassed and about 50° C. when it is effective.

9 Claims, 1 Drawing Figure

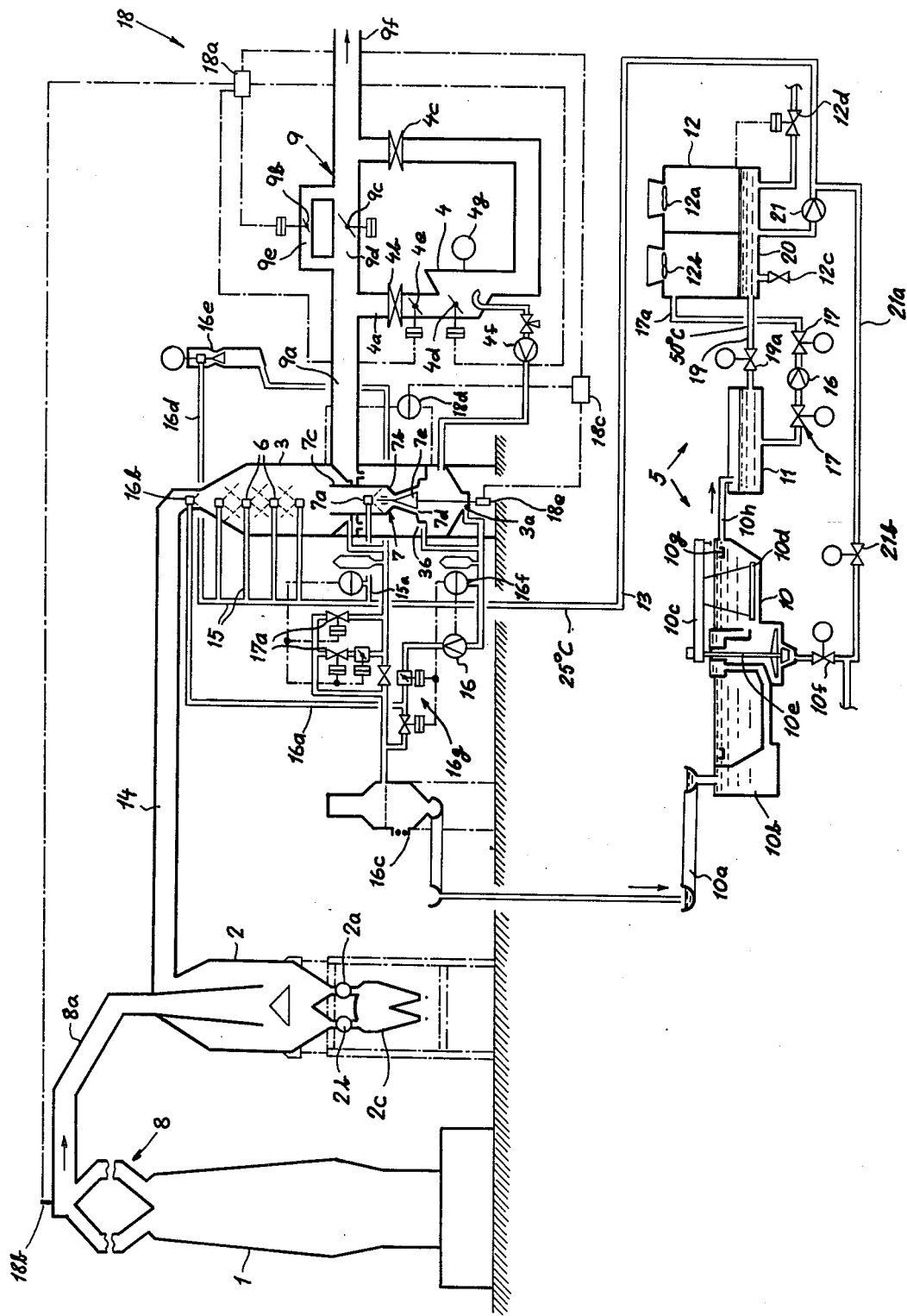

GAS-CLEANING APPARATUS AND METHOD FOR HIGH-PRESSURE BLAST FURNACE

CROSS REFERENCE TO RELATED APPLICATIONS

This application relates to i.e. deals with subject matter disclosed in, a commonly assigned copending application Ser. No. 818,675 (now U.S. Patent No.) filed July 25, 1977, in the name of one of the present joint inventors application Ser. No. 818,675, is a continuation-in-part of Ser. No. 692,731 filed June 4, 1978 U.S. Pat. No. 4,055,331 Ser. No. 692,731 was a continuation in part of Ser. No. 520,920 filed Nov. 4, 1974 an application which has since matured into U.S. Pat. No. 4,007,025. This latter application was, in turn, copending with and related to applications which ultimately matured into U.S. Pat. Nos. 3,854,908, 3,844,744, 3,844,745 and 3,726,065. See also U.S. Pat. No. 4,052,042 and U.S. Pat. No. 3,976,454.

FIELD OF THE INVENTION

The present invention relates to a gas-cleaning apparatus and method, and more particularly, to an improvement in a plant for the cleaning of exhaust gas of a blast furnace operating under pressure which also enables control of the back pressure at the blast furnace.

BACKGROUND OF THE INVENTION

As will be apparent from the aforementioned copending application and related work in the field (see the patents listed above), it is known to provide a high-pressure blast furnace with a gas-cleaning plant which obtains a maximum of useful energy from the exhaust gas, controls effectively the back pressure of the blast furnace, and prevents pollution of the atmosphere.

Basically, such an apparatus can comprise, in addition to the blast furnace and the usual gas locks, gates or bells affording withdrawal of the exhaust gas in large volume while maintaining the back pressure, at least of the following important components of the gas-cleaning plant:

(a) a coarse dust or particle separator;
(b) a washing or scrubbing tower;
(c) an expansion-turbine unit; and
(d) a scrubbing water separator.

The first of these units, namely, the coarse dust or particle separator may be a cyclone from which particulates settle or are otherwise discharged from the gas and can include dust-pocket or collector-type dust catchers using any conventional dust-recovery mode of operation.

From that coarse-particle separator, the gas is subjected to scrubbing in a wash tower or scrubbing tower which can be provided at an upper or upstream portion thereof with a multiplicity of turbulent spray nozzles or jets (swirl jets). In the lower end of the washing tower there is provided at least one Venturi element constituting, for example, a Venturi scrubber and serving at least in part to control the pressure differential across the Venturi passage to thereby regulate the back pressure in the blast furnace.

The exhaust gas which has discharged its particles in the dust collector and has been scrubbed and cooled in the scrubbing tower and the Venturi scrubber, is then generally admitted to an expansion turbine for the work-producing expansion of the gas which converts its potential energy into useful work. For example, the expansion turbine can operate an electric-power generator. The gas is then generally subjected to further processing to recover it heat value, i.e. can be recirculated to combustion chambers or metallurgical processes and the residual heat value of the components of the gas can be utilized.

The scrubbing-water unit recovers the wash water used in the scrubbing and washing tower and can include a settling and separating tank in which solids are separated from the liquid, the solids being in the form of a sludge from which the liquid is decanted.

Decanted liquid generally passes into a collecting tank and can be fed to a cooling installation, e.g. a force-draft cooling tower, before being supplied again to the scrubber.

The turbine installation is provided with a bypass so that, when the turbine is cut off, the scrubbed exhaust gas can be discharged from the system to the installation capable of recovering the heat value in the manner described.

The Venturi scrubber can be of the annular-gap washer type described in any of the aforementioned patents and usually comprises a Venturi duct in which, in the region of the most constricted portion of the duct, a frustoconical or other convergent or divergent body is displaceable for control of the pressure drop across the Venturi passage.

The term "heat value" is used herein to refer generally to the chemical energy of the gas when the latter is burned. The heat value may be due to the presence of oxidizable components such as hydrogen and carbon monoxide or to the presence of carbonaceous particles, hydrocarbons or even products of the reaction in the blast furnace which are not scrubbed out during the processing of the gas. Such heat value can be recovered by adding the gas to a fuel and subjecting the mixture to oxidation (combustion) or by using the recovering gas directly as a heating gas.

In the operation of such a plant, it is desirable that the enthalpy of the gas emerging from the blast furnace be as high as possible since a high enthalpy also corresponds to a high expansion-turbine efficiency. Thus the exhaust gas should be introduced into the expansion turbine unit at the highest possible temperature.

However, it will be recalled that the gas before introduction into the expansion-turbine unit is subjected to scrubbing, i.e. to an intensive washing with water which, if carried out to the most efficient degree, will result in substantially complete saturation of the gas with water. This, of course, reduces the heat value of the gas since it dilutes combustibles therein with water vapor.

Thus, in order to obtain a gas with high heat value it is necessary to limit the water content of the gas. This means that the gas temperature after treatment in the scrubbing tower should be relatively low.

From the foregoing it will be apparent that two countervailing interests are involved. On the one hand, effective operation of the turbine requires a maximum temperature after scrubbing while, on the other hand, desire to obtain maximum exploitation of the heat value of the same gas requires a lower temperature after scrubbing.

In conventional blast furnace gas-cleaning systems, therefore, the operation is a compromise and it is particularly undesirable that the discharged gas have a relatively high temperature and a low heat value when the expansion turbine is bypassed or cut off. In the latter case, one does not obtain the gas at an optimum heat value and does not make up this energy loss by recovering it at the expansion turbine.

OBJECTS OF THE INVENTION

It is the principal object of the present invention to provide a plant or apparatus for cleaning pressurized blast furnace exhaust gases which eliminates the latter problem and which permits an optimum exploitation of both the heat value and the potential energy of the exhaust gas.

Another object of the present invention is to provide an improved method of operating an apparatus for cleaning of blast-furnace exhaust gases to improve the overall efficiency thereof.

Yet a further object of the invention is to provide an improved method of cleaning a blast-furnace exhaust gas so that discharges of earlier systems are avoided.

SUMMARY OF THE INVENTION

We have now discovered that these objects are readily obtainable and a major problem with earlier systems can be solved by providing a bypass for the cooling unit of the scrubbing water recirculating system which is effective when the expansion turbine is operative to deliver scrubbing water of substantially higher temperature to the washer or scrubber, but which is rendered ineffective when the turbine is bypassed so that the scrubbing water undergoes the usual cooling and is fed to the scrubbing tower at a much lower temperature.

With respect to the apparatus aspects of the invention, therefore, we provide between the collecting vessel and the cooling unit of the system for recirculating scrubbing water to the washing tower, a bypass duct so that the scrubbing liquid bypasses the cooling portion of the cooling tower or apparatus. Naturally, when the cooling tower includes, below the cooling plates packing, one or more collecting chambers or troughs, this bypass can run directly from the reservoir to the sump or collecting trough of the cooling tower.

The bypass and the means for delivering the water from the reservoir to the cooling elements of the cooling tower can be provided with valves, pumps or the like to permit selective transfer of water either through the bypass or through the normal duct arrangement. When the turbine is cut off, the water delivered to the washing tower can be at a temperature such that the exhaust gas leaves this tower at a temperature of only up to 30° C. Depending upon the ambient temperature, however, the temperature of the gases leaving the scrubbing tower can be still lower.

However, when the turbine is bypassed by the gas the water delivered to the cooling tower is at a temperature of about 40° or more so that the exhaust gas leaving the tower has a temperature of about 60° C. or more. Thus it is an important feature of the invention that the scrubbing or washing tower be supplied with water upon bypassing the cooling unit, which has a temperature of about 50° C. when the expansion turbine is rendered ineffective but is supplied with cooled water through this cooling unit at a maximum temperature of about 25° C. when the expansion turbine is fully effective.

The advantage of the system of the present invention is that it affords excellent efficiency when the turbine is operative and even when it is not, in the latter case the heat value of the gas being at a maximum.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating the principles of the present invention. de

SPECIFIC DESCRIPTION

In the drawing we have shown a blast furnace 1 whose mouth 8 is provided with a gas-recovery hood connected by a duct 8a to a coarse particle separator 2. The latter can be of the cyclone or bag-filter type, the collected particles being removed through gates 2a and 2b and a hopper 2c.

A duct 14 connects the particle separator 2 with the top of a scrubbing tower 3 into which water is fed by the lines 15 and is dispensed by swearl nozzles 6. Below the prewashing portion formed by the nozzles, the scrubbing tower 3 is provided with a Venturi-type annular-gap washer 7 which cooperates with a further nozzle 7a by a line 15a with a duct 13 which also feeds lines 15.

The annular-gap washer comprises a converging portion 7b at the end of a cylindrical duct 7c which, beyond the Venturian constriction, diverges at 7d and receives a gap-controllign downwardly widening conical body 7e controlling the pressure differential across this annular-gap washer. The diverging portion 7d opens into a duct 9a of the turbine and bypass unit 9, 4.

More particularly, the scrubbed gas is delivered via the duct 9a to the duct 4a which has a cut off valve 4b cooperating with another cut off valve 4c to separate the expansion turbine form the system. The expansion turbine 4 is of the variable-vane type, the vanes being controlled as represented by the damper 4d. Proportioning between a bypass 9 and the turbine 4 is controlled by the vanes 4d, a controllable damper 4e in the duct 4a, and a pair of dampers 9b and 9c in a main portion 9d of the bypass 9 and a shunt passage 9e thereof. The principle of operation of the bypass 9 will be apparent from U.S. Pat. No. 4,007,025.

The duct 9f carries the waste gas from the system and to a plant capable of utilizing the heat value of this gas.

The scrubbing-water unit generally represented at 5 comprises a settling tank 10, a water reservoir 11 and cooling towers 12, the water from which the solids have been settled, being returned by pump 21 from the sump 20 of the cooling towers 12 to the line 13 which feeds the washer 3.

More specifically, waste water from the washer 3 is collected by the sump 3a thereof and by the intermediate bottom 3b or is delivered to the sump by a pump 4f which drains it from the turbine 4 which is connected to a generator 4g. The pump 16 can in part recirculate the scrubbing water via a line 16a to a spray nozzle 16b at the head of the tower 3 and in part deliver the water via an intermediate filter or settling unit 16c to the trough 10a feeding the inlet 10b of the settling tank 10.

The sludge within the settling tank 10 is continuously stirred by a radial arm 10c carrying a rake 10d and rotated by a motor (not shown) via a shaft 10e. Sludge can be drawn via a valve 10f from the bottom of this settling tank and clarified water is decanted at a trough 10g along the rim of the tank for delivery by a pipe 10h to the reservoir 11.

The reservoir 11 is connected by a network of valves 11a and 11d and a pump 11b with a pipe 11c communicating with the tops of the cooling towers 12 which are of the force-draft type as represented by the blowers 12a and 12b of these towers. The towers can be provided internally with any desired packing or filling material, e.g. trickle plates 12g, the water passing downwardly along these plates counter to the upward flow of air during the cooling process. The cooling towers 12 are provided with the usual sump 20 from which the recirculated water is fed by a pump 21 to line 13 in the manner previously described. p In accordance with an important feature of the invention, a bypass line 19 is provided between the reservoir 11 and the sump 20 of the cooling towers, this line having a control valve 19a. It will be apparent that line 19 thus bypasses the cooling packing 12g of the towers 12 and is capable of delivering water to the sump 20 at a substantially higher temperature, e.g. around 50° C. than the water arriving at the sump 20 after passing through the packing of the cooling towers 12. A drain valve 12c is provided for the sump 20 to allow complete draining thereof while a level control valve 12d is responsive to the level of water in the sump 20 to drain any excess. Line 21a from pump 21 is normally closed by a valve 21b which can be opened when valve 10f is open to draw sludge from the settling tank 10.

The drawing also shows, in somewhat diagrammatic form, the control system for the pressure in the blast furnace and, since this system may use principles of the earlier patents and application mentioned previously and is not directly a part of this invention, a detailed review of these control elements will not be provided.

Suffice it to say that one control unit 18a is provided to control the dampers 4d, 4e, 9b and 9c in response to the detected pressure at 18b of the blast furnace, this control unit also feeding a signal of the controller 18c which responds via the sensor 18d to the pressure differential across the angular-gap washer 7 and provides an output to a servomotor 18e for positioning of the body 7e.

The water control system includes a line 16d from line 15 which runs to a valve 16e whereby the excess scrubbing water can be returned to unit 16c. Pressure control valves 17a are responsive to the pressure in lines 15 and 15a to control this return flow. The pump 16, in turn, is controlled in response to pressure via a unit 16f which can also operate a shut-off valve and throttle arrangement represented at 16g.

In other words, the system shown in the drawing has several modes of operation. When the valves 4b and 4c are open and the dampers 9b and 9c are closed, all of the gas passes through the expansion turbine 4 and drives the generator 4g. The pressure at the blast furnace is controlled by dampers 4d and 4e and by the body 7c. Partial control can be afforded by the dampers 9b and 9c as well. When valves 4b and 4c are closed, the body 7e and dampers 9b and 9c control the back pressure.

As will be apparent from the foregoing, therefore, the four basic units of the apparatus of the present invention are:
(a) a coarse particle separator 2;
(b) the washing or scrubbing tower 3;
(c) the expansion turbine unit 4 with its bypass 9; and
(d) the wash tower treating unit 5.

The wash tower 3 thus includes, in addition to the water spray nozzles 6, which are preferably constituted as swirl nozzles, the Venturi element 7 constituted as an annular-gap washer performing the dual functions of intimate contacting of the scrubbing water with the gas and controlling the back pressure of the blast furnace 1.

The expansion turbine unit 4 can be cut off in which case the bypass 9 is effective.

The basic elements of the wash water preparation unit 5 are the settling and separating basin or tank 10 from which the water is decanted from the sedimenting solids, the collecting reservoir 11 and the cooling towers 12. The scrubbing water is recycled via line 13 to the wash tower 3.

Key to the present invention is the wash-water bypass line 19 between the reservoir 11 and the water-collection sump 20 of the cooling towers 12. This bypass line 19 permits the wash water to be returned to the tower 3 without passing through the cooling stage of the towers 12.

In the embodiment illustrated, which also constitutes a preferred embodiment of the present invention, the cooling units 12 are forced-draft cooling towers with sumps 20 forming water collectors below the packings of the towers. Thus the bypass line 19 can deliver water directly to this reservoir without having the water trickle through the packing.

When the expansion turbine is operative, the bypass line 19 is also effective and relatively warm water at a temperature of about 50° C. is delivered to the reservoir 20 and from there is recirculated by pump 21 to the washing tower 3. When, however, the expansion turbine unit 4 is cut off and bypass 9 is effective, the bypass 19 is cut off and the water is recirculated via the pump 11b, the cooling portions of the towers 12 and pump 21 at a temperature of about 25° C. to the washing tower 3, thereby cooling the exhaust gas to a correspondingly lower temperature.

We claim:
1. A gas-cleaning installation for a pressurized blast furnace comprising, in combination:
  particle-separation means connected to a gas outlet of said pressurized blast furnace for removing particulates from a gas emerging therefrom;
  a wash tower connected to said particle-separation means, said tower being provided with spray nozzles for scrubbing gas from said particle-separation means with water, and a venturi scrubber downstream from said spray nozzles;
  a turbine unit receiving gas from said venturi scrubber, said turbine unit including an expansion turbine, a gas bypass bridged across said turbine, and means for selectively cutting off said turbine and rendering said turbine effective; and
  wash-water preparation means for receiving water from said wash tower and recycling water to said nozzles, said wash-water preparation means including:
    settling means for settling solids from wash water derived from said wash tower,
    a collecting reservoir for receiving water from said settling means,
    cooling means connectable with said reservoir for subjecting wash water to be recycled to cooling,
    a water bypass connected to said reservoir and across said cooling means for delivering uncooled water to said tower, and
    control means for rendering said water bypass effective when said turbine is operative to deliver relatively warm water to said wash tower and for cutting off said water bypass and render- ing said cooling means effective when said turbine is inoperative.

2. The installation defined in claim 1 wherein said cooling means is formed as part of a cooling tower having a water-collecting sump below said cooling means, said sump being connected by a water-recycling conduit to said nozzles, said water bypass communicating between said reservoir and said sump.

3. The installation defined in claim 2 wherein said venturi scrubber is an annular-gap scrubber provided with a movable body controlling the back pressure at said blast furnace.

4. The installation defined in claim 3, further comprising valve means for selectively passing said gas from said venturi scrubber through said expansion turbine and through said gas bypass.

5. The installation defined in claim 4 wherein said settling means is a settling tank provided with a rotary rake for stirring sediment in said tank.

6. In a method of operating a plant for the cleaning of gas from a pressurized blast furnace wherein the gas withdrawn from said blast furnace is subjected to particle removal, the gas after particle removal is washed with water and then scrubbed in a venturi scrubber, the gas after scrubbing can be subjected to expansion in an expansion turbine, and the water for the washing and scrubbing of the gas is recycled after cleaning, the improvement which comprises:

supplying recycled wash water at a temperature of about 50° C. to the washing and scrubbing of the gas when the gas is thereafter subjected to expansion, and supplying the water to the washing and scrubbing of the gas at a temperature of about 25° C. when the gas is not expanded.

7. The improvement defined in claim 6 wherein the recycled wash water is passed through a cooling tower prior to use in the washing and scrubbing of the gas at said temperature of about 25° C., said tower being bypassed for supply of the water at said temperature of about 50° C.

8. The improvement defined in claim 7, further comprising the step of generating electrical energy with the expansion of the gas.

9. The improvement defined in claim 8 wherein the gases scrubbed with water in an annular-gap washer having a movable body, further comprising the step of controlling the position of said body to maintain the back pressure of the gas at said blast furnace substantially constant.

* * * * *